(12) United States Patent
Halahan et al.

(10) Patent No.: US 8,948,921 B2
(45) Date of Patent: Feb. 3, 2015

(54) SYSTEM AND METHOD FOR SMART IRRIGATION

(75) Inventors: Patrick B. Halahan, Novato, CA (US);
J. Patrick McIntyre, Novato, CA (US);
Mark Coopersmith, Novato, CA (US);
Mark Puckett, Novato, CA (US)

(73) Assignee: ET Water Systems, Inc., Novato, CA (US)

( * ) Notice: Subject to any disclaimer, the term of this patent is extended or adjusted under 35 U.S.C. 154(b) by 415 days.

(21) Appl. No.: 13/301,679

(22) Filed: Nov. 21, 2011

(65) Prior Publication Data

US 2012/0303168 A1   Nov. 29, 2012

Related U.S. Application Data

(60) Provisional application No. 61/416,100, filed on Nov. 22, 2010.

(51) Int. Cl.
G06F 19/00 (2011.01)
A01G 25/16 (2006.01)

(52) U.S. Cl.
CPC ...... *A01G 25/165* (2013.01); *G05B 2219/2625* (2013.01); *A01G 25/167* (2013.01); *A01G 25/16* (2013.01)
USPC ........................................................ 700/284

(58) Field of Classification Search
CPC ........... G06B 2219/2625; A01G 25/16; A01G 25/167
USPC ........................................................ 700/284
See application file for complete search history.

(56) References Cited

U.S. PATENT DOCUMENTS

| | | | |
|---|---|---|---|
| 6,895,987 B2 * | 5/2005 | Addink et al. | 137/78.3 |
| 7,596,429 B2 * | 9/2009 | Cardinal et al. | 700/284 |
| 7,633,485 B2 * | 12/2009 | Reed et al. | 345/156 |
| 7,769,494 B1 * | 8/2010 | Simon et al. | 700/284 |
| 7,899,580 B2 * | 3/2011 | Cardinal et al. | 700/284 |
| 7,962,244 B2 * | 6/2011 | Alexanian | 700/284 |
| 2003/0093159 A1 * | 5/2003 | Sieminski | 700/12 |
| 2004/0039489 A1 * | 2/2004 | Moore et al. | 700/284 |
| 2004/0181315 A1 * | 9/2004 | Cardinal et al. | 700/284 |
| 2005/0055106 A1 * | 3/2005 | Beutler et al. | 700/11 |
| 2008/0154437 A1 * | 6/2008 | Alexanian | 700/284 |

* cited by examiner

*Primary Examiner* — Michael D Masinick
(74) *Attorney, Agent, or Firm* — Perkins Coie LLP

(57) ABSTRACT

A smart irrigation system for an irrigation controller associated with an irrigation site is described herein. The smart irrigation system comprises a central control system having a user interface and a smart scheduler. The central control system is configured to derive and send an irrigation schedule for the irrigation. The smart scheduler comprises a data receiver, a processor, and a signal interface. The data receiver is configured to receive the irrigation schedule. The processor is configured to convert the irrigation schedule to a series of control signals that the irrigation controller recognizes. The signal interface is configured to connect to the irrigation controller and to send the series of control signals to the irrigation controller. The system uses weather data and irrigation site-specific information to automatically apply the optimal irrigation schedule. User are able to remotely control the irrigation via networks such as Internet.

62 Claims, 4 Drawing Sheets

SYSTEM AND METHOD FOR SMART IRRIGATION

PRIORITY CLAIM

This application claims the benefit of U.S. Provisional Application No. 61/416,100 under 35 U.S.C. 119(e), filed Nov. 22, 2010, the contents of which is incorporated herein by reference.

BACKGROUND

Irrigation system is important for landscaping. Plant health depends on a properly designed irrigation system supplying enough water. It is also desired to have an irrigation system minimizing wasting water. Conventional watering systems allow users to manually program watering schedules based on timers. But the watering schedules do not take into account the current varying rate of water loss and weather changes. As a result, such timer based system does not utilize the water usage at an optimal level.

More advanced irrigation systems exist whereby a moisture sensing system provides feedback to the controlling unit that enough water has been applied. A sensor is needed for each area being watered and this can get expensive.

It would be desirable to have a cost effective irrigation system that calculate, update, adjust, and provide a water schedule automatically based on information source available to the system, while minimizing the system replacement/upgrade cost.

SUMMARY

Introduced herein is a smart irrigation system for an irrigation controller associated with an irrigation site. According to one embodiment, there is provided a smart irrigation system. The smart irrigation system comprises a central control system having a user interface and a smart scheduler (also referred to as smart controller). The central control system is configured to receive a landscape information associated with the irrigation site. The landscape information is provided by a user via the user interface. The central control system is further configured to receive an environmental information associated with the irrigation site. The central control system is further configured to derive an irrigation schedule for the irrigation site based on the landscape information and the environmental information. The central control system being further configured to send the irrigation schedule. The smart scheduler comprises a data receiver, a processor, and a signal interface. The data receiver is configured to receive the irrigation schedule. The processor is configured to convert the irrigation schedule to a series of control signals that the irrigation controller recognizes. The signal interface is configured to connect to the irrigation controller and to send the series of control signals to the irrigation controller. The series of control signals does not need to be sent to the irrigation controller instantaneously. The series of control signals may be sent to the irrigation controller over time according to the irrigation schedule.

According to another embodiment, there is provided a smart scheduler for an irrigation controller associated with an irrigation site. The smart scheduler comprising a data receiver configured to receive an irrigation schedule from a network, a processor configured to convert the irrigation schedule to a series of control signals that the irrigation controller recognizes, a power interface configured to receive an electric power from the irrigation controller and to convert a voltage of the electric power to an internal DC voltage that the smart scheduler runs at, a power storage configured to provide power for the smart scheduler when the power interface does not receive the electric power from the irrigation controller, a user control configured to allow the user to control and setup the smart scheduler, a display configured to show a status or information associated with the smart scheduler, and a signal interface configured to connect to the irrigation controller and to send the series of control signals to the irrigation controller.

According to yet another embodiment, there is provided a method of irrigate an irrigation site using an irrigation controller. The method comprising steps of receiving a landscape information associated with the irrigation site, retrieving an environmental information associated with the irrigation site, deriving an irrigation schedule for the irrigation site based on the landscape information and the environmental information, converting the irrigation schedule to a series of control signals that the irrigation controller recognizes, and controlling the irrigation controller to irrigate the irrigation site by sending the series of control signals to the irrigation controller.

In one embodiment, the system minimizes the replacement/upgrade cost by converting an existing irrigation controller into a smart controller. The smart controller uses weather data and irrigation site-specific information to automatically apply the optimal irrigation schedule. Furthermore, users are able to remotely control the irrigation system via networks such as Internet.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Figure 1:
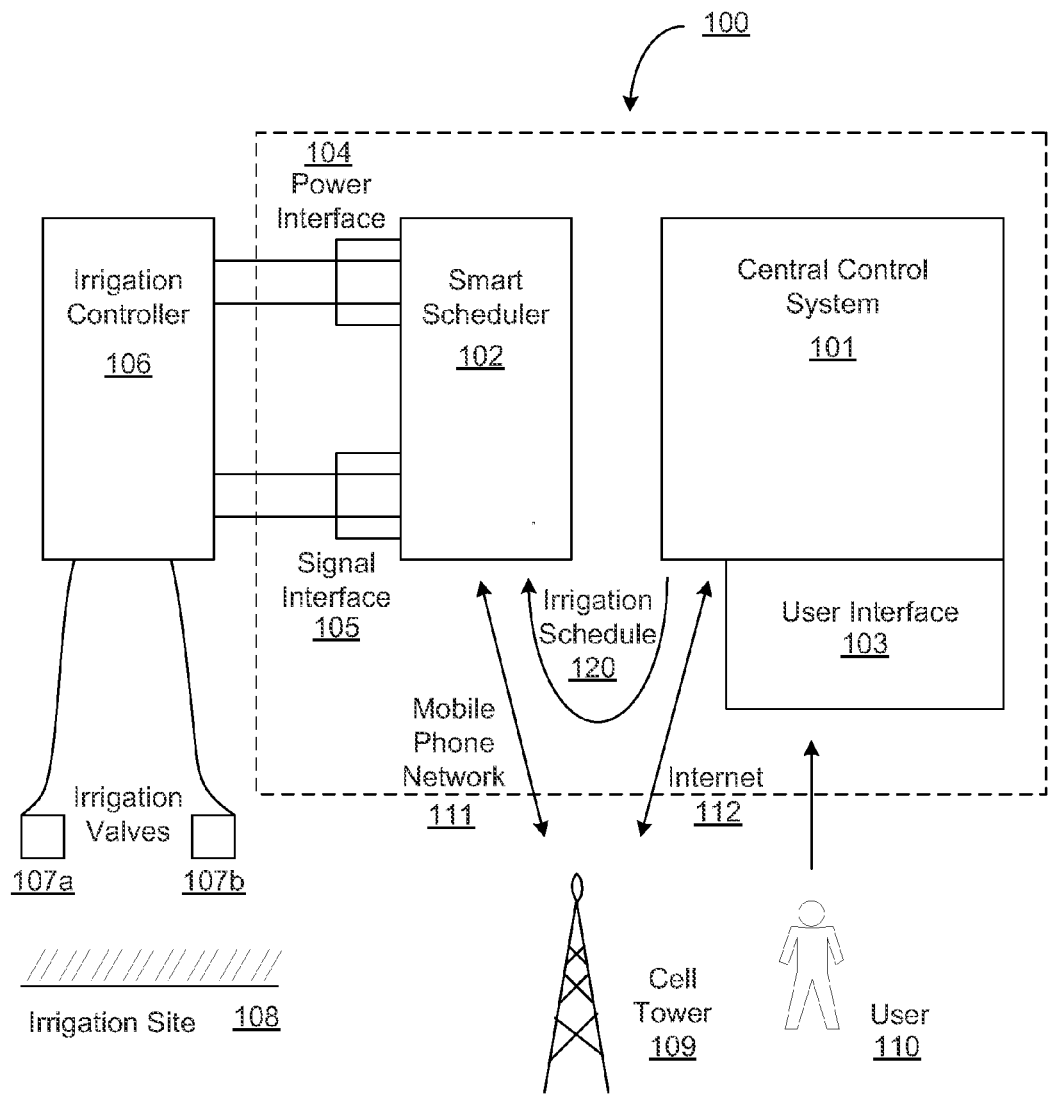
FIG. 1 is a block diagram of a smart irrigation system according to one embodiment.

FIG. 1 illustrates a smart irrigation system 100 in which the techniques introduced herein can be implemented. The smart irrigation system 100 includes a central control system 101 and a smart scheduler 102. The smart scheduler 102 (also referred to as an "add-on device", a "smart controller converter" or a "smart converter") is designed to convert an existing conventional irrigation controller (also referred to as a "host"), usually a timer based controller, to a smart irrigation controller. The solution minimizes the update/replacement cost by simply add the smart schedule 102 onto the existing system, without any further modification. The smart scheduler 102 contains a signal interface 105 configured to connect to the existing irrigation controller 106. The smart scheduler 102 connects to the irrigation controller 106 and uses the irrigation controller's output control block of electronics to carry out a downloaded irrigation schedule 120. Many timer-based controllers come equipped with a remote access port by which a wireless remote control unit can be connected. In some embodiments, the smart scheduler 102 mimics as a wireless remote for the irrigation controller 106. The signal interface 105 is configured to connect and communicate to the irrigation controller 106 via the remote access port of the irrigation controller 106. With minimal changes to the irrigation controller 106, the smart scheduler 102 can gain control of these timer-type controllers by connecting to the port and mimicking the commands of a wireless remote. In some other embodiments, the smart scheduler 102 mimics a main processor block for the irrigation controller 106.

Utilizing a unique electrical signal interface 105 and a range of choices of connector cables, the smart scheduler 102 can handle may different electrical requirement, which allows it to connect to a variety of models of existing irrigation controllers. A universal connection cable may also be contemplated.

By connecting to the existing irrigation controller 106, the smart scheduler 102 is able to take over the control of the irrigation controller. The smart scheduler 102 determines how the system irrigates the associated irrigation site 108 by controlling the irrigation valves 107a and 107b through the existing irrigation controller 106. In conjunction with web services that are delivered to the device via a variety of methods, the smart scheduler 102 enables the conversion of a timer-based controller into a system or a combination of devices that together operates as a smart controller. The smart controller receives an irrigation schedule from a server when the system logs on via any of several communication methods and, using the schedule, turns on and off the appropriate irrigation valves for the amount of time communicated from the servers. The smart scheduler 102, like the controller described in U.S. Pat. No. 7,596,429, incorporated herein by reference in its entirety, communicates with the central control system 101 in a number of methods including but not limited to telephone, satellite link, wireless via GPRS or other cell phone technology, wireless messaging including SMS, and WiFi. This smart scheduler 102 and the controller described in U.S. Pat. No. 7,596,429 use a form of data compression to keep the communications data size as small as possible, and thereby the costs as low as possible. This data compression is not necessary for the operation of this smart scheduler 102 or the patented controller but it is used to minimize the communication costs and enhance the value to the customer.

This smart scheduler 102 utilizes the concept outlined in U.S. Pat. No. 7,596,429 and expands on that teaching. This device can be used by an operator or an owner or any other interested party to save water and convert their conventional irrigation controller to a "smart" controller, or convert other controllers in general to a controller that utilizes ET Water's irrigation scheduling and communication solution.

This smart scheduler, as well as the controller described in U.S. Pat. No. 7,596,429, has additional unique capabilities for irrigation control. This smart scheduler, as well as the systems described in U.S. Pat. No. 7,596 429 responds to Instant Messaging or SMS messaging to allow quick response to commands without the overhead for data requirements of being always connected. This is a novel way of controlling and communicating with an irrigation controller. These commands include, but are not limited to, watering a station now, suspending irrigation and logging on to a central server for an update to the irrigation schedule. This aspect of this smart scheduler, and the irrigation controller described in U.S. Pat. No. 7,596,429, allows overriding control of certain aspects of the two devices using a cell phone or mobile communications device. This allows a smart cell phone or other web enabled device to provide remote watering capability and, therefore, can be used to replace a wireless remote system.

This smart scheduler 102 also has the ability to be connected to a rain sensor (not shown) so irrigation can be halted in a rain event.

The smart scheduler 102 has a user interface incorporated in the unit so it can be set up, controlled and certain functions that take over or control the host can be tested. For example the host type can be picked from a menu or list and the device will then know how to communicate with the host. A test can then be done to insure it is communicating with the host.

Figure 2:
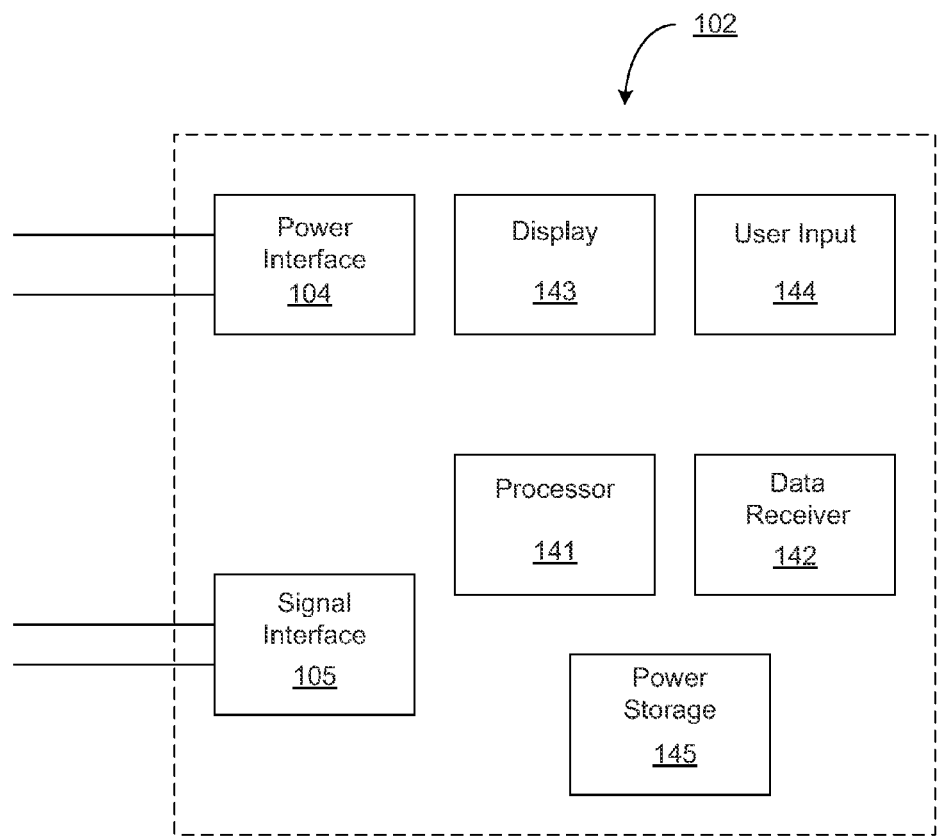
FIG. 2 is a block diagram of a smart scheduler according to one embodiment.

An example of the smart scheduler 102 is illustrated in FIG. 2. In one embodiment, the smart scheduler 102 contains a signal interface 105, a power interface 104, a process 141, a data receiver 142, a display 143, a user control 144 and a power storage 145. The data receiver 142 is configured to receive the irrigation schedule 120 from the central control system 101. In some embodiments, the data receiver 142 may be a modem. This could be a cell type modem such as a CPRS modem, a WiFi modem, a Short Messaging System (SMS) modem, satellite modem, or a telephone modem or other connection device.

In one embodiment, the modem is usually used to log onto the central control system 101 once every 24 hours to collect the irrigation schedule for the day. In order to improve the user experience and make the system more useful a specific ways are developed for the device to connect via the modem.

For cell type modems, these modems can be contacted from the Internet by either placing a phone call to it or using the Short Messaging System (SMS) channel, A system of commands is used over the SMS channel which are used to tell the device to do certain things like water a station now or log on to the sever now, This allows much more instant control of the device.

For WiFi modems, these modems can be contacted via the internet as long as the IP address of the modem is known. The IP address may change, for example, after a power outage on a DSL modem. To get around this issue the device checks it own IP address on a regular basis and if the IP address changes it will ping the server to let the server know its new IP address.

For telephone modems, the modem may act like a fax on the phone line. If a call comes through the modem can sense it is for a fax and hence pick up to answer the call.

The display 143 and user control 144 are used to control and setup the device. The processor 141 controls the smart scheduler 102 and may convert the irrigation schedule to a series of control signals that the irrigation controller can recognize.

The power interface 104 is configured to retrieve electric power from the existing irrigation controller 106. Therefore, the smart scheduler does not need any additional power lines reserved for it. The design further reduces the cost of the installation. Various irrigation controllers use different internal voltage and power scheme, In some embodiments, the power interface is constructed to convert the voltage of the input power to an internal DC voltage that the smart scheduler runs at.

In some embodiments, the host side isolation circuits need to work at voltage levels as high as 30 volts as at least one host uses this level as opposed to the more typical 3.3 or 5 volt voltage levels.

There is a power storage 145 that provides limited power in the event that the input power is removed for some reason. This allows time keeping in the processor 141 to continue for some limited time. In the event of multiple input power failures, the power storage 145 negates the need for the device to log on to the server to get a refresh of the time and date.

FIG. 1 shows how the device works in a mobile phone modem configuration. When the smart schedule 102 is attached to the host, irrigation controller 106, together they become a smart irrigation controller. The device communicates via a cell tower 109 to the central control system 101 to get current irrigation schedules. The central control system 101 may also need to communicate with the device via the cell tower. The user or operator 110 enters the correct parameters to create the irrigation schedule by logging onto the user interface 103 of the central control system 101 using a web browser running on for example a computer. The user or operator 110 typically will enter landscape parameters for example plant type, micro zone parameters like shade and irrigation parameters like sprinkler type. In some embodiments, the user interface is a webpage or website. In some embodiments, the user interface is a mobile phone application.

Figure 3:
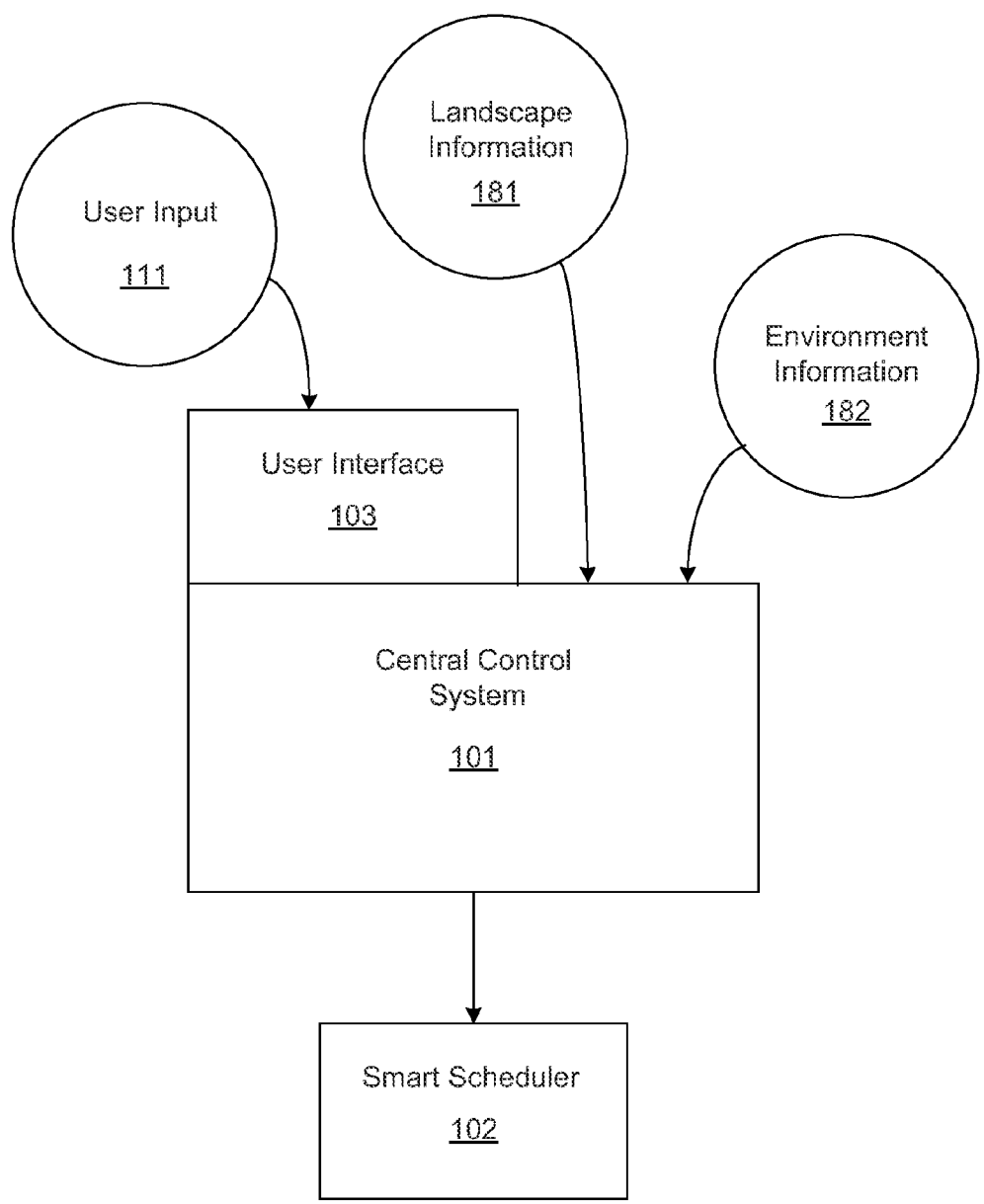
FIG. 3 is a system diagram illustrating a central control system, according to one embodiment.

FIG. 3 is a system diagram illustrating a central control system 101 according to one embodiment. The central control system 101 receives, analyzes and stores data from a variety of sources, including landscape information 181, environmental information 182, and user input 111. Landscape information herein refers to information about the landscape of the irrigation site 108 to be irrigated, including, but not limited to, soil type, slope information, plant type, age of plant, sun exposure, precipitation rate, distribution uniformity, root depth of plant, dripline diameter of plant, number of emitters per plant, flow rate of emitter, plant coefficient, seasonality of plants, and irrigation method. Environmental information refers to information about the environment surround the landscape to be irrigated, such as evapotranspiration information and weather information. The central control system 101 may receive weather information from multiple weather stations. The smart irrigation system uses data gathered from many weather stations to calculate the evaporative transpiration (evapotranspiration) and hence calculate an irrigation schedule.

Figure 4:
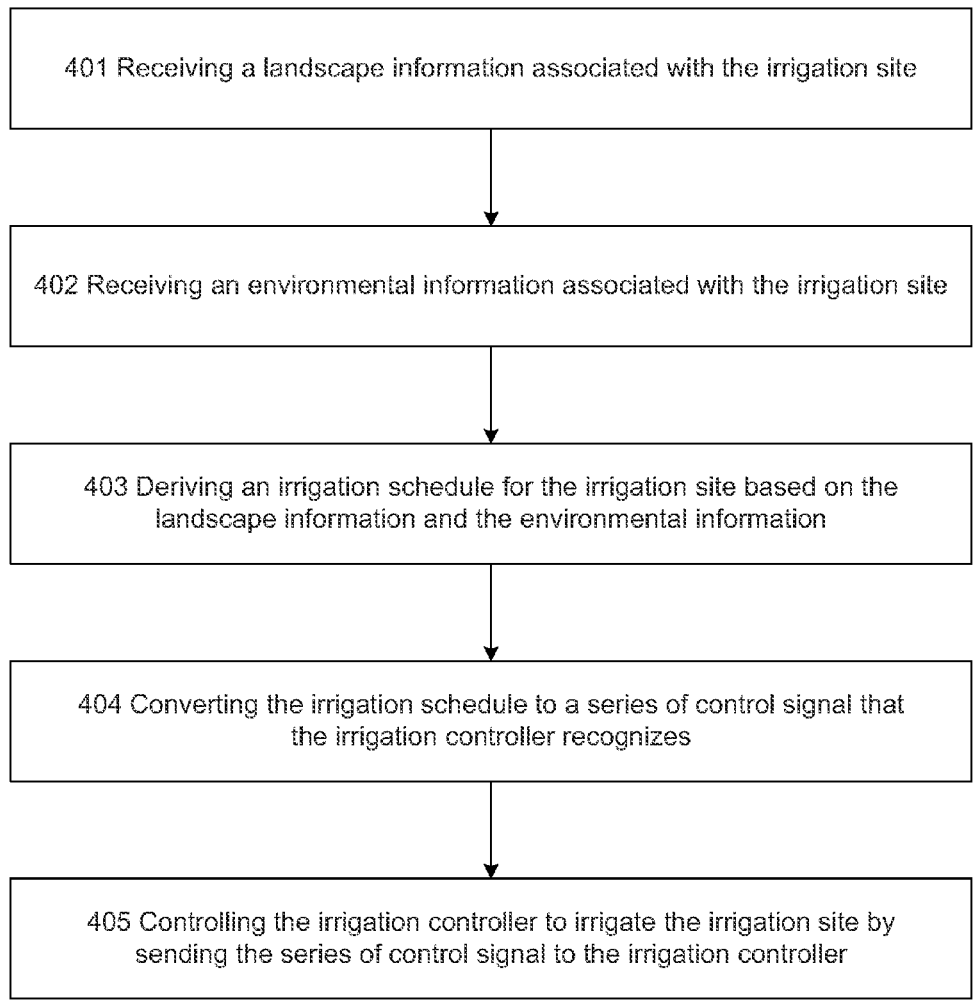
FIG. 4 depicts a flow chart illustrating an example process for irrigation.

FIG. 4 depicts a flow chart illustrating an example process for irrigating an irrigation site using an irrigation controller, according to one embodiment. First step 401 is receiving a landscape information associated with the irrigation site. Then there is a step 402 of retrieving an environmental information associated with the irrigation site. Step 403 is deriving an irrigation schedule for the irrigation site based on the landscape information and the environmental information. After step 403, it is the step 404 of converting the irrigation schedule to a series of control signals that the irrigation controller recognizes. Then, there is a step of 405 of controlling the irrigation controller to irrigate the irrigation site by sending the series of control signals to the irrigation controller.

The smart scheduler 102 may have serial or parallel signal configurations for the signal interface 105. In some embodiments, a serial to parallel circuit is used to as to reduce the number of lines that need to be isolated hence reducing the overall cost. For example, such a system may use 3 signal lines for the serial circuit and have 50 lines for the parallel circuit.

In some embodiments, the device has a signal isolator for isolating the signal lines for a few signals. There is isolation of outbound signals and inbound signals. The sensor has also been isolated to reduce any conflict on its signal. The signal isolator may be opto-isolators, but there are other technologies that can be used. The signals from or to the host also need to be isolated so they can be set to have the correct common. The connector can be used with internal jumpers to setup the cable for a particular host.

In some embodiments, the device has an isolated power supply. The power supplies of host controllers often vary from host to host, with representative differences ranging from 36 volts DC to 24 volts AC. The side of the power supply that is used as the signal common also changes. To get around these variations the device has an isolated power supply. The antenna if used on the device may be mounted on a conductive enclosure so this becomes an earth point and the isolated power supply allows this to occur.

The smart irrigation system described herein includes features including taking over control from the installed host so as to make the system "smart," replacing the wireless remote by allowing the use of a smart phone for remote watering of stations, employing a variety of techniques to contact the controller to gain nearly instant access to it and have it carry out commands, isolating the power supply and signal lines to allow signaling and avert any power problems.

In some instances, the existing irrigation controllers that do not have a communications port for a wireless remote can also be used as host for a smart scheduler. A number of irrigation devices have split electronics consisting of a block that contains the display and processor, connected via a ribbon cable to a board that contains the station switching circuits and inputs for sensors like rain sensors or flow sensors. The signals the ribbon cable are either a signal or a series of signals for each station or a serial bit stream with information as to which output to turn on. By reverse engineering the signals, the smart scheduler can bypass the existing processor and directly connect to the ribbon cable to the board. Therefore, the smart scheduler directly controls the station switching circuit.

In some embodiments, the smart irrigation system may contain a smart controller capable of directly coupling to the existing field wire connections. The controller has a control interface which is designed to electrically connect to the existing field wire connections to control one or more irrigation station valves. When the existing irrigation controlling system is upgraded, all existing field wires can be retained and controlled by the new smart controller.

In some embodiments, the smart irrigation system can remotely control the irrigation via Internet. In one embodiment, the central control system is a central control server. The central control server hosts a website as a remote user interface. Via an electronic device having an Internet access, such as a computer, a mobile phone, a tablet, or a personal digital assistant, a user can remotely control the irrigation system by providing inputs on the website. Based on the input provided by the user, the central control server generates and sends the irrigation control data instantly to the local smart scheduler. In one embodiment, the smart schedule switches to a direct control mode to convert the irrigation control data into control signals to control the irrigation. In some other embodiments, the remote user interface may be a computer application running on a computer, or a mobile device app running on a mobile device. The user enters the inputs and the application or the app transmits the input information to the central control server.

In some embodiments, the smart irrigation system may further contain one or more flow sensors being configured to send flow signals to the processor. In one embodiment, a flow sensor is installed in proximity of a shut off valve for the irrigation site water supply. So that the system can detect the total water flow information. In another embodiment, a flow sensor is installed in proximity of each station valve, so that the system can measure the water flow for each irrigation station.

In some embodiments, the smart irrigation system may further contain at least one rain gauge, such as a Upping bucket rain gauge, to measure the rain precipitation. The rain gauge is configured to send a precipitation signal back to the processor for fine-tuning the irrigation schedule and controlling.

In some embodiments, the smart irrigation system may further contain a solar power panel providing power to the smart scheduler. In one embodiment, the smart scheduler can solely rely on the solar power panel for its power consumption.

In some embodiments, the smart irrigation system may further contain means for uplink transmission. In one embodiment, the means for the means for uplink transmission is configured to transmit the data collected by the smart scheduler to the central control server.

In some embodiments, the smart irrigation system may further contain a user control configured to allow the user to control and setup the smart scheduler. In one embodiment, for example, the user control is a control knob configured to be rotated and pressed.

In some embodiments, there are a two-way communication between the smart scheduler and the irrigation controller. In one embodiment, the processor of the smart irrigation system is further configured to receive information from the irrigation controller. In another embodiment, for example, the information received from the irrigation controller contains the number of stations that are controlled by the irrigation controller.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A smart irrigation system for converting an existing host irrigation controller associated with an irrigation site into a smart irrigation controller, the smart irrigation system comprising:
    a central control system having a user interface, the central control system being configured to receive a landscape information associated with the irrigation site, the landscape information being provided by a user via the user interface,
    the central control system being further configured to receive an environmental information associated with the irrigation site,
    the central control system being further configured to derive an irrigation schedule for the irrigation site based on the landscape information and the environmental information,
    the central control system being further configured to send the irrigation schedule; and
    a smart controller converter, the smart controller converter comprising:
        a data receiver configured to receive the irrigation schedule;
        a processor configured to convert the irrigation schedule to a series of control signals that the irrigation controller recognizes, and;
        a signal interface configured to connect to a remote access port on the host irrigation controller and to send the series of control signals to the host irrigation controller; and
        a data transmitter configured to transmit a status or information associated with the smart controller converter to the central control system, wherein the central control system is further configured to adjust the irrigation schedule based on the status or information associated with the smart controller converter.

2. The smart irrigation system of claim 1, wherein the smart controller converter further comprises a power interface configured to receive an electric power from the host irrigation controller.

3. The smart irrigation system of claim 2, wherein the power interface is further configured to convert a voltage of the electric power to an internal voltage that the smart controller converter runs at.

4. The smart irrigation system of claim 3, wherein the internal voltage is a DC voltage.

5. The smart irrigation system of claim 1, wherein the smart controller converter further comprises a power storage configured to provide power for the smart controller converter when the power interface does not receive the electric power from the irrigation controller.

6. The smart irrigation system of claim 1, wherein the smart controller converter further comprises a user control configured to allow the user to control and setup the smart controller converter.

7. The smart irrigation system of claim 1, wherein the smart controller converter further comprises a display configured to show a status or information associated with the smart controller converter.

8. The smart irrigation system of claim 1, wherein the data receiver comprises a modem selected from the group consisting of telephone modem, GPRS modem, WiFi modem, cell phone modem, satellite modem, and Short Messaging System (SMS) modem.

9. The smart irrigation system of claim 1, wherein the irrigation schedule is sent to the smart controller converter via a network.

10. The smart irrigation system of claim 1, wherein the irrigation schedule is sent to the smart controller converter via the Internet.

11. The smart irrigation system of claim 1, wherein the irrigation schedule is sent to the smart controller converter via a telephone line.

12. The smart irrigation system of claim 1, wherein the irrigation schedule is sent to the smart controller converter via a mobile phone network.

13. The smart irrigation system of claim 1, wherein the irrigation schedule is sent to the smart controller converter via a combination of a mobile phone network and the Internet.

14. The smart irrigation system of claim 1, wherein the user interface is a web interface.

15. The smart irrigation system of claim 1, wherein the user interface is a mobile phone application.

16. The smart irrigation system of claim 1, wherein the smart controller converter is further configured to connect to a rain sensor.

17. The smart irrigation system of claim 1, wherein the central control system is further configured to retrieve updated environmental information.

18. The smart irrigation system of claim 1, wherein the landscape information comprises information selected from the group consisting of soil type, slope information, plant type, age of plant, sun exposure, precipitation rate, distribution uniformity, root depth of plant, dripline diameter of plant, number of emitters per plant, flow rate of emitter, plant coefficient, seasonality of plants, and irrigation method.

19. The smart irrigation system of claim 18, wherein the dripline and emitter parameters comprises dripline diameter, number of emitters per plant and flow rate of emitter.

20. The smart irrigation system of claim 1, wherein the environmental information comprises information selected from the group consisting of evapotranspiration information, and weather information.

21. The smart irrigation system of claim 1, wherein the irrigation schedule comprises a restriction on the amount of water used.

22. The smart irrigation system of claim 1, wherein the irrigation schedule comprises a valve command.

23. The smart irrigation system of claim 1, wherein the smart controller converter is further configured to initiate a request for the central control system to send the irrigation schedule.

24. The smart irrigation system of claim 1, wherein the landscape information is accessible to the user via the user interface.

25. The smart irrigation system of claim 1, wherein the central control system is further configured to allow the user adjusting the landscape information via the user interface.

26. The smart irrigation system of claim 1, wherein the irrigation schedule is accessible to the user via the user interface.

27. The smart irrigation system of claim 1, wherein the central control system is further configured to allow the user adjusting the irrigation schedule via the user interface.

28. The smart irrigation system of claim 1, wherein the irrigation schedule is derived further based on station flow rates and maximum allowable system flow.

29. The smart irrigation system of claim 1;
wherein the user interface of the central control system is further configured to receive inputs from a user to remotely control the smart controller converter;
wherein the central control system is further configured to transmit an irrigation control signal based on the inputs provided by the user;
wherein the data receiver of the smart controller converter is further configured to receive the irrigation control signal; and
wherein the processor of the smart controller converter is further configured to convert the irrigation control signal into a series of control signals; and
wherein the smart controller converter further comprises a control interface configured to be electrically coupled to a station switching circuit to directly control one or more irrigation station valves.

30. A smart controller converter configured to convert a host irrigation controller associated with an irrigation site into a smart irrigation controller, the smart controller converter comprising:
a data receiver configured to receive an irrigation schedule from a central control system, wherein the central control system comprises a user interface, wherein the irrigation schedule is derived by the central control system based on a landscape information and an environmental information, wherein the landscape information is input by a user via the user interface, wherein the environmental information is received by at least one sensor associated with the irrigation site;
a processor configured to convert the irrigation schedule into a series of control signals;
a signal interface configured to connect to a remote access port on the host irrigation controller and to send the series of control signals to the host irrigation controller; and
a data transmitter configured to transmit a status or information associated with the smart controller converter to the central control system, wherein the central control system is further configured to adjust the irrigation schedule based on the status or information associated with the smart controller converter.

31. The smart controller converter of claim 30, wherein the smart controller converter further comprises a power interface configured to receive an electric power from the host irrigation controller.

32. The smart controller converter of claim 31, wherein the power interface is further configured to convert a voltage of the electric power to an internal voltage that the smart controller converter runs at.

33. The smart controller converter of claim 32, wherein the internal voltage is a DC voltage.

34. The smart controller converter of claim 30, wherein the smart controller converter further comprises a power storage configured to provide power for the smart controller converter when the power interface does not receive the electric power from the host irrigation controller.

35. The smart controller converter of claim 30, wherein the smart scheduler further comprises a display configured to show a status or information associated with the smart controller converter.

36. The smart controller converter of claim 30, wherein the data receiver comprises a modem selected from the group consisting of telephone modem, GPRS modem, WiFi modem, cell phone modem, satellite modem, and Short Messaging System (SMS) modem.

37. The smart controller converter of claim 30, wherein the irrigation schedule is sent to the smart controller converter via a network.

38. The smart controller converter of claim 30, wherein the irrigation schedule is sent to the smart controller converter via the Internet.

39. The smart controller converter of claim 30, wherein the irritation schedule is sent to the smart controller converter via a telephone line.

40. The smart controller converter of claim 30, wherein the irritation schedule is sent to the smart controller converter via a mobile phone network.

41. The smart scheduler smart controller converter of claim 30, wherein the irritation schedule is sent to the smart controller converter via a combination of a mobile phone network and the Internet.

42. The smart controller converter of claim 30, wherein the series of control signals is sent to the irrigation controller over time according to the irrigation schedule.

43. The smart controller converter of claim 30, further comprising a sensor interface configured to receive senor data collected at an irrigation site.

44. The smart controller converter of claim 43, wherein the data transmitter is further configured to transmit the sensor data to the central control system, wherein the central control system is further configured to adjust the irrigation schedule based on the sensor data.

45. The smart controller converter of claim 30, further comprising a display configured to show status or information associated with the smart controller converter.

46. A method of controlling irrigation at an irrigation site using a smart controller converter coupled to a host irrigation controller, the method comprising steps of:

receiving a landscape information associated with the irrigation site, wherein the landscape information is input by a user;

retrieving an environmental information associated with the irrigation site, deriving an irrigation schedule for the irrigation site based on the landscape information and the environmental information, transmitting the irrigation schedule to the smart controller converter, wherein the smart controller converter converts the irrigations schedule into a series of control signals recognizable to the host irrigation controller, wherein the smart controller converter transmits the series of control signals to the host irrigation controller to control irrigation at the irrigation site;

receiving from the smart controller converter a status or information associated with the smart controller converter; and updating the irrigation schedule based on the received status or information associated with the smart controller converter.

47. A smart irrigation system for remotely controlling a host irrigation controller associated with an irrigation site, the smart irrigation system comprising:

a central control server hosting a user interface so that a user can remotely control the irrigation system by providing inputs via the user interface, wherein the user interface is accessible by an electronic device, the central control server being configured to generate and send irrigation control data based on the inputs provided by the user; and a smart controller converter, the smart controller converter comprising:

a data receiver configured to receive the irrigation control data, a processor configurable to convert the irrigation control data to a series of control signals;

a signal interface configurable to connect to a remote access port on the host irrigation controller and to send the series of control signals to the host irrigation controller;

a user control configured to receive a user setup input, wherein the user setup input configures the signal interface to connect with the remote access ort and configures the processor to convert the irrigation control data into a series of control signals recognizable to the host irrigation controller; and a sensor interface configured to receive a sensor data collected at the irrigation site; and a data transmitter configured to transmit the sensor data collected at the irrigation site to the central control server, wherein the central control server is further configured to update the irrigation control data based on the sensor data collected at the irrigation site.

48. The smart irrigation system of claim 47, wherein the electronic device is a computer, a mobile phone, a tablet, a personal digital assistant, or an electronic device having an Internet access.

49. The smart irrigation system of claim 47, wherein the user interface is a website, a computer application, or a mobile device app.

50. The smart irrigation system of claim 47, further comprising a flow sensor, wherein the sensor data comprises a flow level collected by the flow sensor.

51. The smart irrigation system of claim 50, wherein the flow sensor is in proximity of a shut off valve.

52. The smart irrigation system of claim 50, wherein the flow sensor is in proximity of an irrigation station valve.

53. The smart irrigation system of claim 47, further comprising a rain gauge, wherein the sensor data further comprises a precipitation level collected by the rain gauge.

54. The smart irrigation system of claim 53, wherein the rain gauge is a tipping bucket rain gauge.

55. The smart irrigation system of claim 47, further comprising a solar power panel providing power to the smart controller converter.

56. The smart irrigation system of claim 47, wherein the user control is a knob configured to be rotated and pressed.

57. The smart irrigation system of claim 47, wherein the smart controller converter is configured to communicate with the host irrigation controller in a two-way communication.

58. The smart irrigation system of claim 47, wherein the processor is further configurable to receive information from the host irrigation controller.

59. The smart irrigation system of claim 58, wherein the information received from the host irrigation controller comprises the number of stations being controlled by the host irrigation controller.

60. The smart irrigation system of claim 47, wherein the central control server is further configured to receive a landscape information associated with the irrigation site, and the landscape information is provided by the user via the user interface.

61. A method for controlling irrigation at an irrigation site via a host irrigation controller, the method comprising the steps of :

receiving, via a data receiver, an irrigation schedule from a central control system, wherein the irrigation schedule is derived by the central control system using a landscape information associated with the irrigation site and an environmental information associated with the irrigation site, wherein the landscape information is input by a user;

receiving from the user, via a user control, a setup input;

based on the setup input, configuring a signal interface to connect with a remote access port located on the host irrigation controller;

based on the setup input, configuring a processor to convert the irrigation schedule into a series of control signals, wherein at least one of the series of control signals is recognizable by the host irrigation controller;

transmitting, via signal interface connected to the remote access port, the series of control signals to the host irrigation controller;

transmitting, via the data transmitter, a status or information associated with the smart controller converter, wherein the central control system derives an updated irrigation schedule based on the status or information associated with the smart controller converter; and receiving, via the data receiver, the updated irrigation schedule from the central control system.

62. The method of claim 61, further comprising the steps of :

receiving, via a sensor interface, a sensor data from a sensor associated with the irrigation site;

transmitting, via the data transmitter, the sensor data to the central control system, wherein the central control system derives an updated irrigation schedule based on the sensor data; and receiving, via the data receiver, the updated irrigation schedule from the central control system.

* * * * *